United States Patent
Zhu et al.

(10) Patent No.: US 10,495,206 B2
(45) Date of Patent: Dec. 3, 2019

(54) INTERNAL RING GEAR, DRIVING ASSEMBLY AND APPLICATION DEVICE

(71) Applicant: JOHNSON ELECTRIC INTERNATIONAL AG, Murten (CH)

(72) Inventors: Xiu Hua Zhu, Shenzhen (CN); Chang Qiao Wu, Shenzhen (CN); Xiao Hui Wang, Shenzhen (CN); Wan Hor Looi, Hong Kong (CN); Jing Ning Ta, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/679,855

(22) Filed: Aug. 17, 2017

(65) Prior Publication Data

US 2018/0051790 A1     Feb. 22, 2018

(30) Foreign Application Priority Data

Aug. 22, 2016   (CN) .......................... 2016 1 0704012
Jun. 14, 2017   (CN) .......................... 2017 1 0449136

(51) Int. Cl.
| | |
|---|---|
| *F16H 1/46* | (2006.01) |
| *F16H 55/06* | (2006.01) |
| *F16H 55/17* | (2006.01) |
| *F16H 57/00* | (2012.01) |
| *F16H 57/08* | (2006.01) |

(52) U.S. Cl.
CPC .............. *F16H 55/06* (2013.01); *F16H 1/46* (2013.01); *F16H 55/17* (2013.01); *F16H 57/0006* (2013.01); *F16H 57/08* (2013.01); *F16H 2055/176* (2013.01)

(58) Field of Classification Search
None
See application file for complete search history.

(56) References Cited

U.S. PATENT DOCUMENTS

| | | | |
|---|---|---|---|
| 2,488,660 A | 11/1949 | Conkle | |
| 2,700,311 A * | 1/1955 | Bade | B64D 35/04 475/330 |
| 3,245,279 A | 4/1966 | Baker | |
| 4,365,525 A * | 12/1982 | Imazaike | G11B 15/67571 192/20 |
| 5,679,089 A * | 10/1997 | Levedahl | F16H 48/10 475/332 |
| 6,338,691 B1 | 1/2002 | Morrow | |
| D842,809 S * | 3/2019 | Sakai | D13/112 |

(Continued)

FOREIGN PATENT DOCUMENTS

| | | |
|---|---|---|
| EP | 0022124 A1 | 1/1981 |
| EP | 3203112 A1 | 8/2017 |

OTHER PUBLICATIONS

Office Action dated Oct. 10, 2019 in EP Application No. 17186728.6.

*Primary Examiner* — Justin Holmes
(74) *Attorney, Agent, or Firm* — Muncy, Geissler, Oldes & Lowe, P.C.

(57) ABSTRACT

The present disclosure provides an internal ring gear, a driving assembly having the internal ring gear, and an application device employing the driving assembly. The internal ring gear includes at least two ring gears integrally arranged in parallel at an inner surface of a single housing.

14 Claims, 8 Drawing Sheets

(56) References Cited

U.S. PATENT DOCUMENTS

| | | | |
|---|---|---|---|
| 2009/0082168 A1* | 3/2009 | Yen | F16H 1/46 |
| | | | 475/337 |
| 2010/0261572 A1* | 10/2010 | Riester | F16H 1/46 |
| | | | 475/331 |
| 2011/0126654 A1 | 6/2011 | Lev et al. | |
| 2013/0269305 A1 | 10/2013 | Wang et al. | |
| 2013/0274049 A1 | 10/2013 | Zhu et al. | |
| 2014/0135166 A1 | 5/2014 | Wang et al. | |
| 2015/0105207 A1* | 4/2015 | Hagedorn | F16H 1/28 |
| | | | 475/149 |
| 2015/0105208 A1* | 4/2015 | Hagedorn | E05F 15/614 |
| | | | 475/149 |

\* cited by examiner

INTERNAL RING GEAR, DRIVING ASSEMBLY AND APPLICATION DEVICE

CROSS REFERENCE TO RELATED APPLICATIONS

This non-provisional patent application claims priority under 35 U.S.C. § 119(a) from Patent Application No. 201610704012.1 filed in The People's Republic of China on Aug. 22, 2016, and Patent Application No. 201710449136.4 filed in The People's Republic of China on Jun. 14, 2017.

FIELD OF THE INVENTION

The present disclosure relates to a driving assembly, and in particular to a driving assembly with an internal ring gear.

BACKGROUND OF THE INVENTION

A power drive mechanism with a reduction gearbox has been applied in many fields, for example, used to drive an automatic lawnmower to move. The reduction gearbox can generate a lot of noise when it operates at high speed, which may cause noise pollution to surrounding environment.

SUMMARY OF THE INVENTION

Accordingly, an internal ring gear is provided which includes at least two ring gears arranged in parallel at an inner surface of a single housing.

Preferably, the ring gears comprise a helical ring gear and a spur ring gear, the teeth of the helical ring gear are disposed at an oblique angle with respect to an axial direction of the housing, and the teeth of the spur ring gear are disposed along the axial direction of the housing.

Preferably, the internal ring gear is made of one or more of plastic, powder metallurgy material and metal.

Preferably, the internal ring gear is made of powder metal material, and has a density less than 92% of its theoretical density, and a mass of 6.0 to 8.0 grams per cubic millimeter.

The present disclosure further provides a driving assembly, which includes a motor and a gearbox. The gearbox includes an internal ring gear including at least two ring gears arranged in parallel at an inner surface of a single housing, with an angle defined between teeth of adjacent ring gears.

Preferably, the ring gears include a helical ring gear and a spur ring gear, the teeth of the helical ring gear are disposed at an oblique angle with respect to an axial direction of the housing, and the teeth of the spur ring gear are disposed along the axial direction of the housing.

Preferably, the internal ring gear is made of one or more of plastic, powder metallurgy material and metal.

Preferably, mounting structures are provided at two end portions of the internal ring gear, the mounting structure at one of the two end portions is configured to mount the internal ring gear to the motor, and the mounting structure at the other of the two end portions is configured to mount the internal ring gear to a mounting seat of the driving assembly.

Preferably, the gearbox is directly fixedly mounted to the mounting seat, and the mounting seat is connected with a load.

Preferably, positioning structures are provided at two end portions of the internal ring gear, the positioning structure at one of the two end portions is configured to position the internal ring gear relative to the motor, and the positioning structure at the other of the two end portions is to position the internal ring gear relative to the mounting seat.

Preferably, the gearbox includes a first planetary gear train and a second planetary gear train, the first planetary gear train is a helical gear train including the helical ring gear, and the second planetary gear train is a spur gear train including the spur ring gear.

In another aspect, an application device is provided which includes the above driving assembly.

Preferably, the application device is a lawnmower or a power lifting door for vehicle.

In the internal ring gear and the driving assembly of the present disclosure, since at least two ring gears are arranged in parallel at an inner surface of a single housing, improved concentricity and stability are obtained, thereby reducing the noise generated by the driving assembly. In addition, this simplifies the assembly and reduces the manufacturing cost.

BRIEF DESCRIPTION OF THE DRAWINGS

The present disclosure will be further described below with reference to the accompanying drawings and embodiments.

DETAILED DESCRIPTION OF THE PREFERRED EMBODIMENTS

Figure 1:
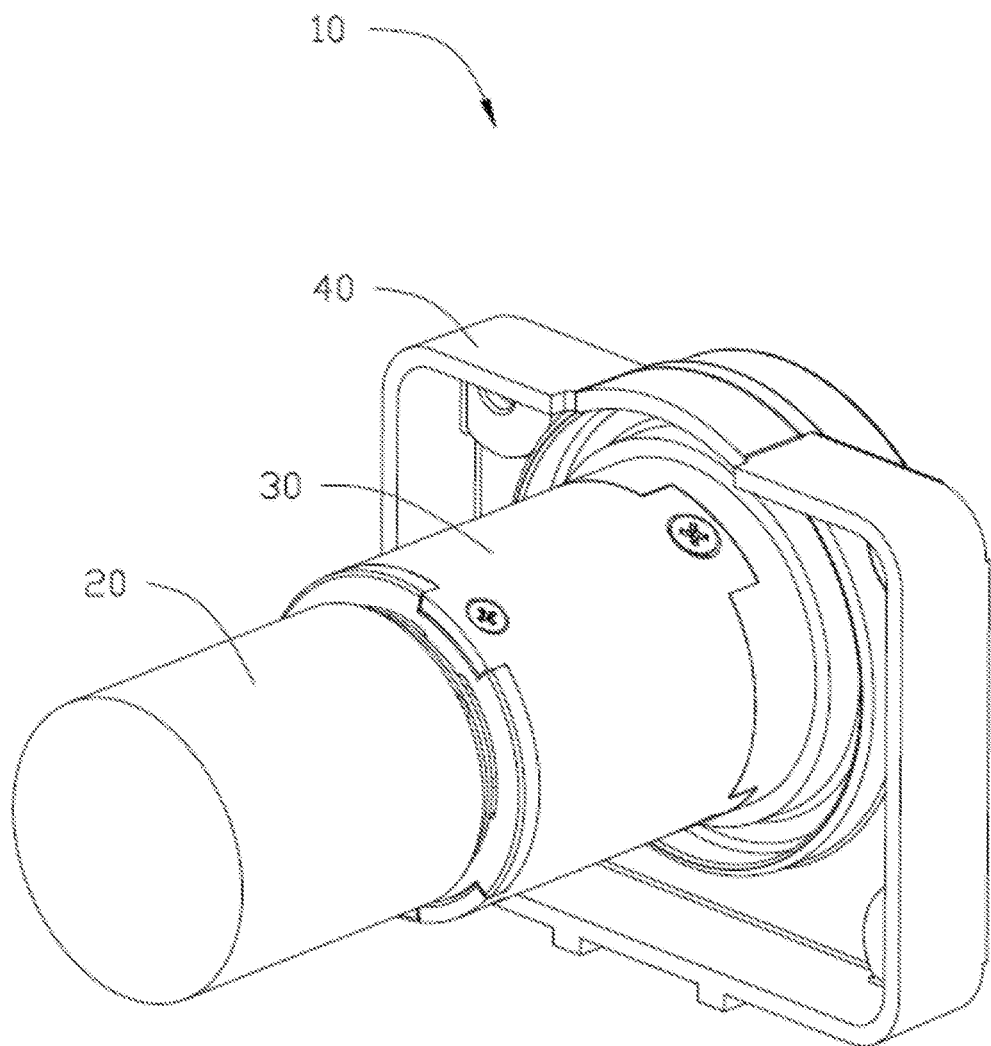
FIG. 1 is a perspective view of a driving assembly according to one embodiment of the present disclosure.
Figure 2:
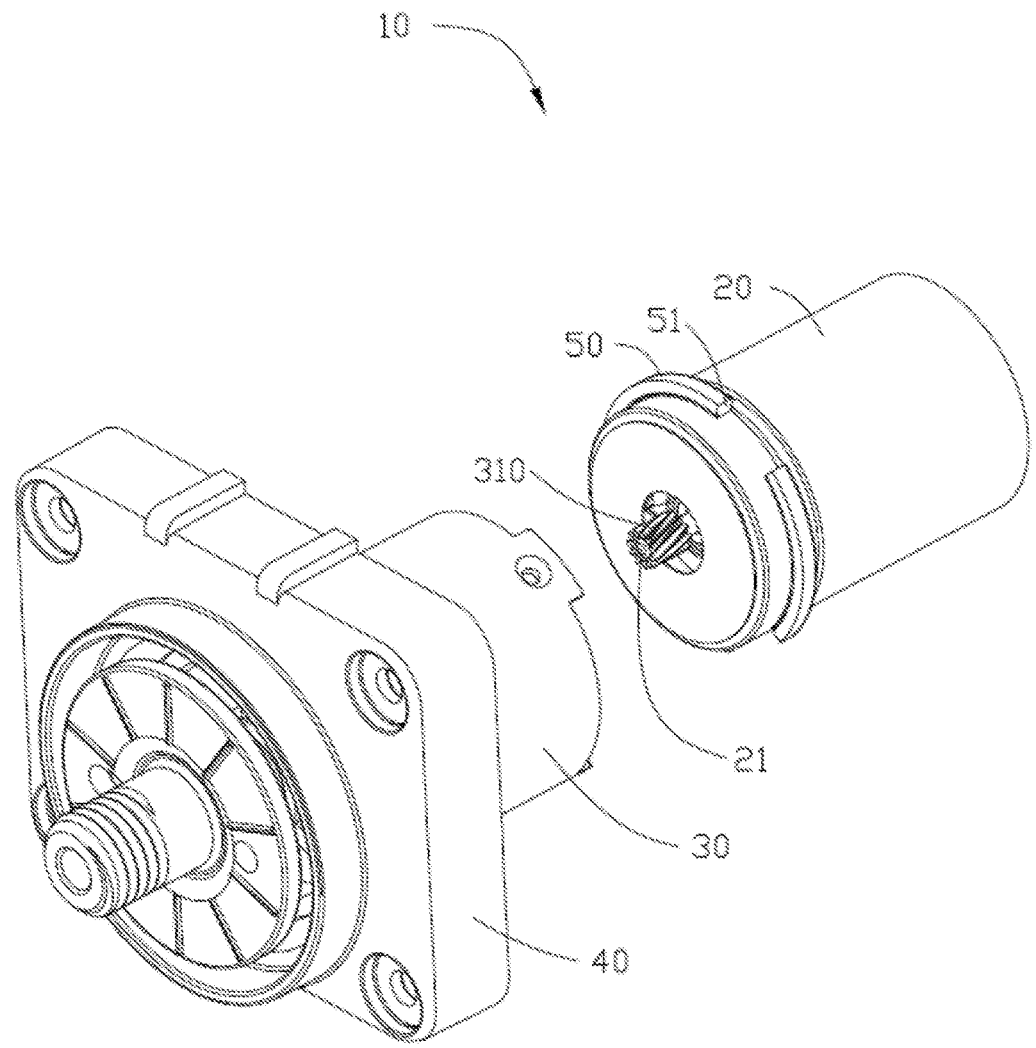
FIG. 2 is a partially exploded view of the driving assembly of FIG. 1.
Figure 3:
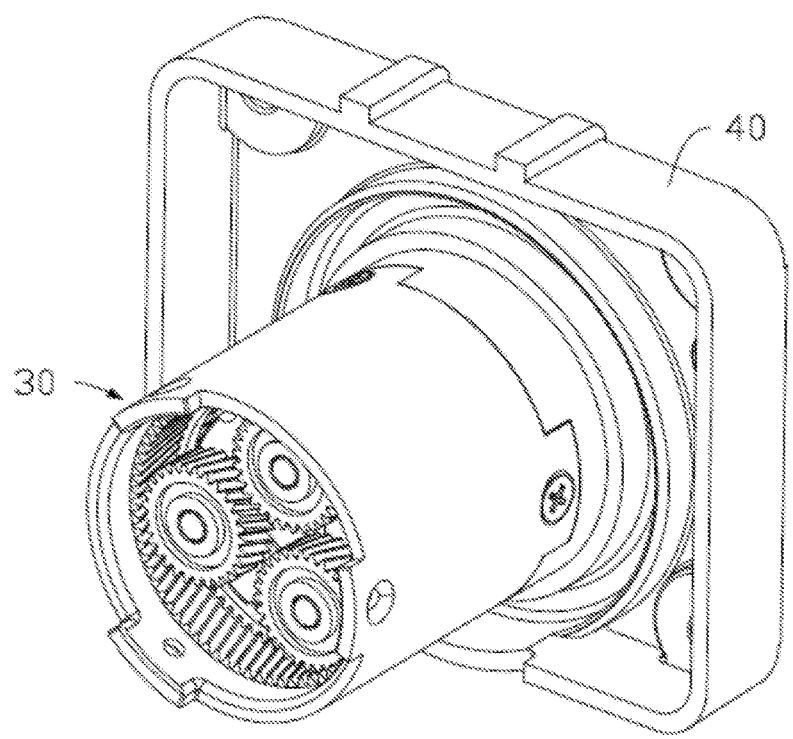
FIG. 3 is a perspective view of the driving assembly shown in FIG. 1, with a motor and a first sun gear being removed.
Figure 4:
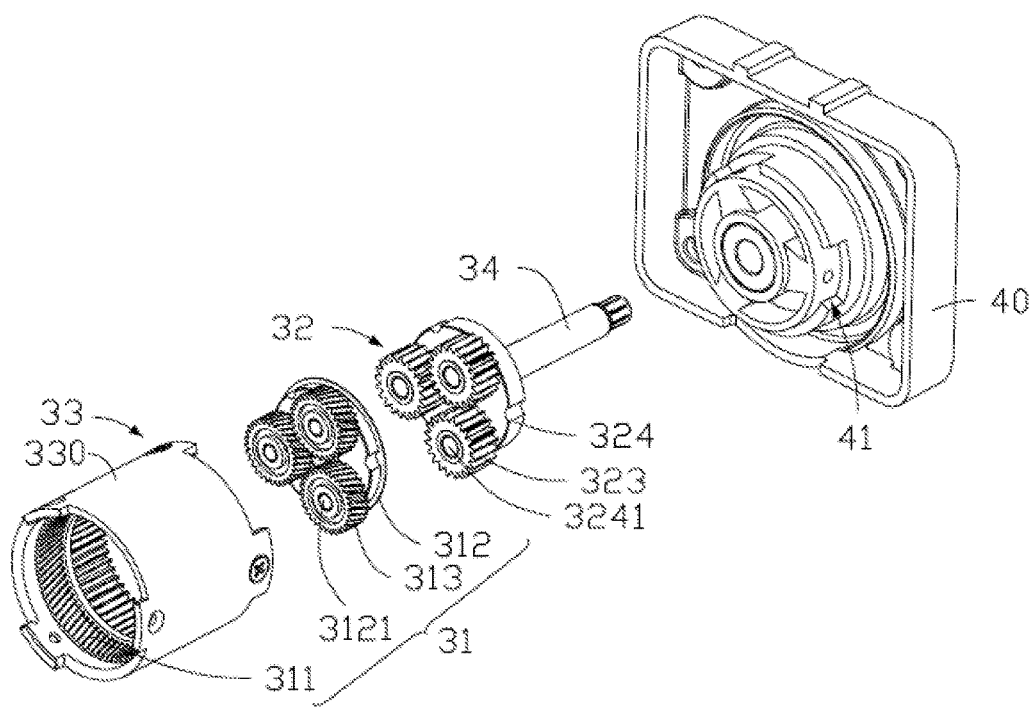
FIG. 4 is an exploded view of the driving assembly shown in FIG. 1, with the motor and the first sun gear being removed.

Embodiments of the present disclosure will be described in greater detail with reference to the drawings. It should be noted that the figures are illustrative rather than limiting. Elements having similar structers or functions are denoted by like reference numerals. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

It is noted that, when a component is described to be "connected" to another component, it can be directly connected to the another component or there may be an intermediate component. When a component is described to be "disposed" on another component, it can be directly disposed on the another component or there may be an intermediate component.

Referring to FIG. 1 to FIG. 5, a driving assembly 10 of one embodiment of the present disclosure is shown. The driving assembly 10 includes a motor 20. The motor 20 is preferably a direct current brushless motor, or alternatively another type of motor. The driving assembly 10 further includes a gearbox 30. One end of the gearbox 30 is mounted to an endcap 50 of the motor 20. The gearbox 30 is driven to rotate by the motor 20. The other end of the gearbox 30 is directly mounted to a mounting seat 40. A shaft 34 extends out of the gearbox 30 to a load and drives the load to rotate.

The gearbox 30 is a reduction gearbox, and includes a first planetary gear train 31 and a second planetary gear train 32. In other embodiments, the gearbox 30 may include a plurality of planetary gear trains.

The first planetary gear train 31 is a helical gear train, and includes a first sun gear 310. The first sun gear 310 is mounted to an output shaft 21 of the motor 20, and is driven by the output shaft 21 of the motor 20 to rotate. The first planetary gear train 31 further includes a first ring gear 311. The first ring gear 311 is disposed at an inner surface of an internal ring gear 33. The first planetary gear train 31 further includes a first planetary gear set which is composed of a first rotary carrier 312 and a plurality of first planet gears 313. The first rotary carrier 312 is used to support the first planet gears 313, and rotates along with the first planet gears 313. Specifically, the first rotary carrier 312 includes two opposite surfaces, and a plurality of rotary pins 3121 protrude from one of the two opposite surfaces. Each rotary pin 3121 is mounted with one corresponding first planet gear 313. The first planet gears 313 are accommodated between the first sun gear 310 and the first ring gear 311, and engage with teeth of the first sun gear 310 and the first ring gear 311, respectively. The first planetary gear train 31 achieves transmission via engagement of helical cylindrical gears, i.e. each of the first sun gear 310, the first ring gear 311 and the first planet gears 313 is a helical cylindrical gear. Since in the helical cylindrical gear transmission the gears gradually engage with each other and gradually disengage from each other, the first planetary gear train 31 can achieve a steady transmission, thereby reducing the noise generated by the first planetary gear train 31 during operation. Preferably, the first planet gears 313 (with high speed and small torque) are made of plastic, thereby further reducing the noise generated by the first planetary gear train 31.

The second planetary gear train 32 is a spur gear train, and includes a second sun gear 321, a second ring gear 322 and a second planetary gear set which is composed of a plurality of second planet gears 323. The second sun gear 321 is mounted to one surface of the first rotary carrier 312 away from the first planet gears 313. Specifically, a rotary pin 3122 protrudes from the one surface of the first rotary carrier 312, and the second sun gear 321 is mounted to the rotary pin 3122 and rotates along with the first rotary carrier 312. The second ring gear 322 is disposed at the inner surface of the internal ring gear 33. The second planetary gear train 32 further includes a second rotary carrier 324. The second rotary carrier 324 is used to support the second planet gears 323 and rotates along with the second planet gears 323. Specifically, the second rotary carrier 324 includes two opposite surfaces, and a plurality of rotary pins 3241 protrude from one of the two opposite surfaces. The second planet gears 323 are mounted to the corresponding rotary pins 3241. The second planet gears 323 are accommodated between the second sun gear 321 and the second ring gear 322, and engage with teeth of the second sun gear 321 and the second ring gear 322, respectively. The second planetary gear train 32 achieves transmission via engagement of spur cylindrical gears. In other embodiments which include a plurality of planetary gear trains, each planetary gear train includes a ring gear.

Figure 5:
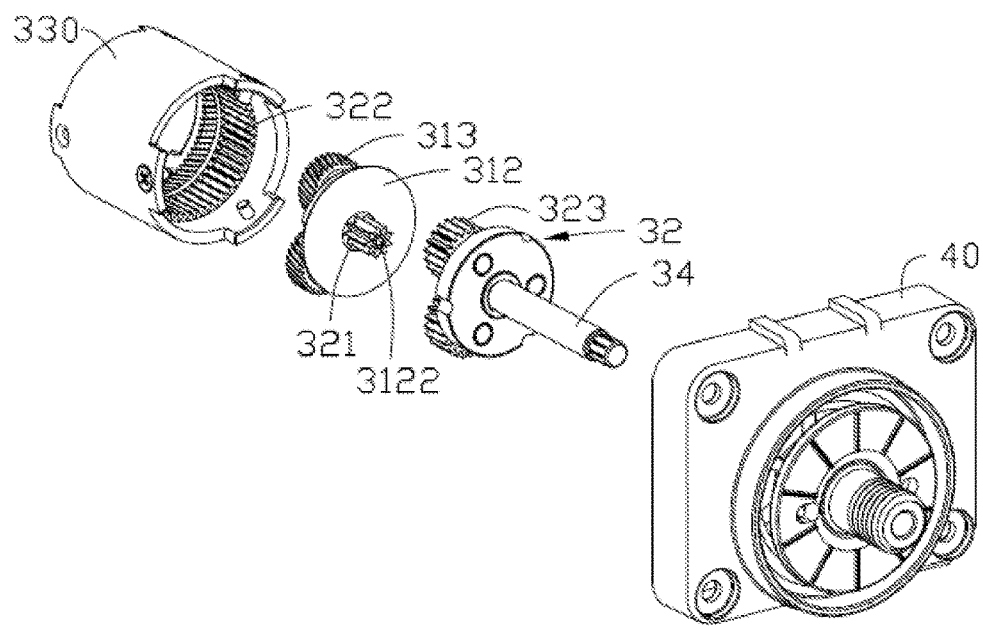
FIG. 5 is an exploded view of the driving assembly shown in FIG. 1, viewed from another aspect, with the motor and the first sun gear being removed.
Figure 6:
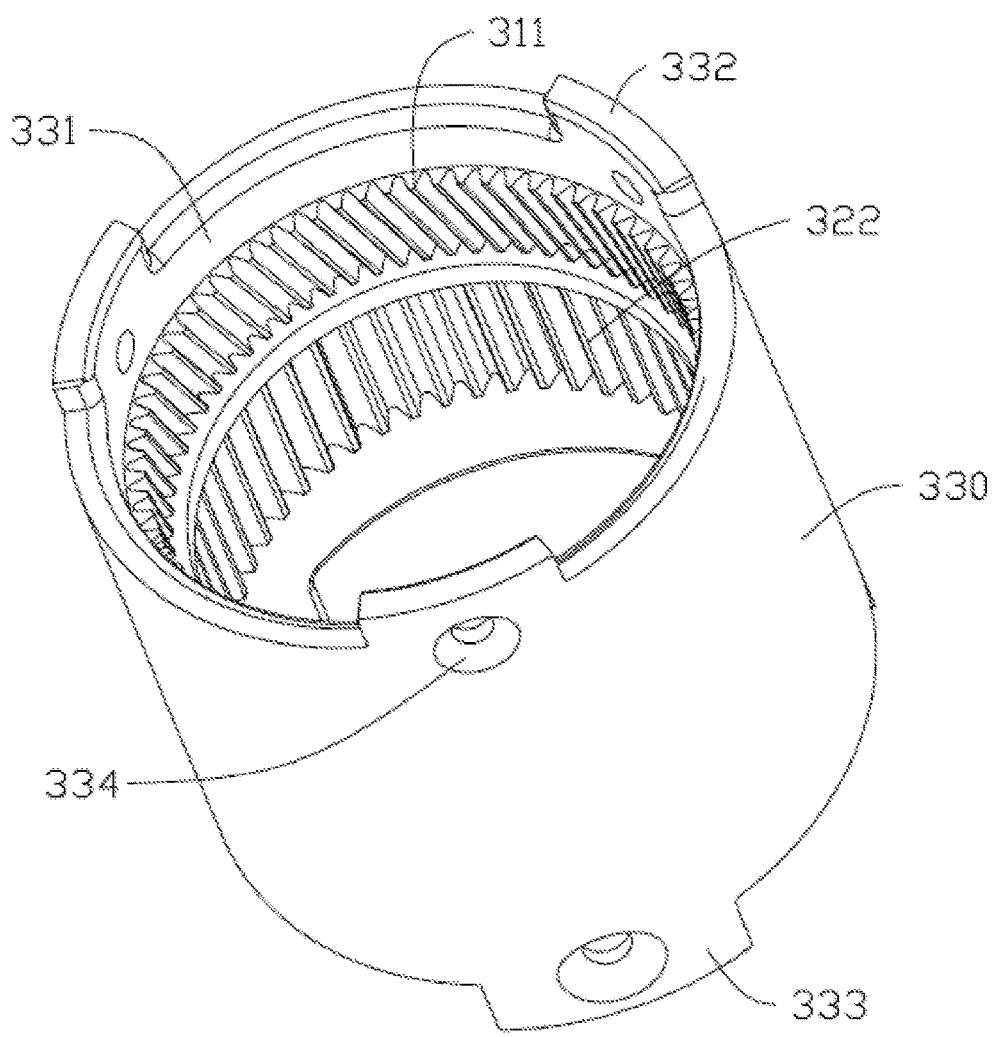
FIG. 6 is a perspective view of an internal ring gear of the driving assembly of FIG. 1.
Figure 7:
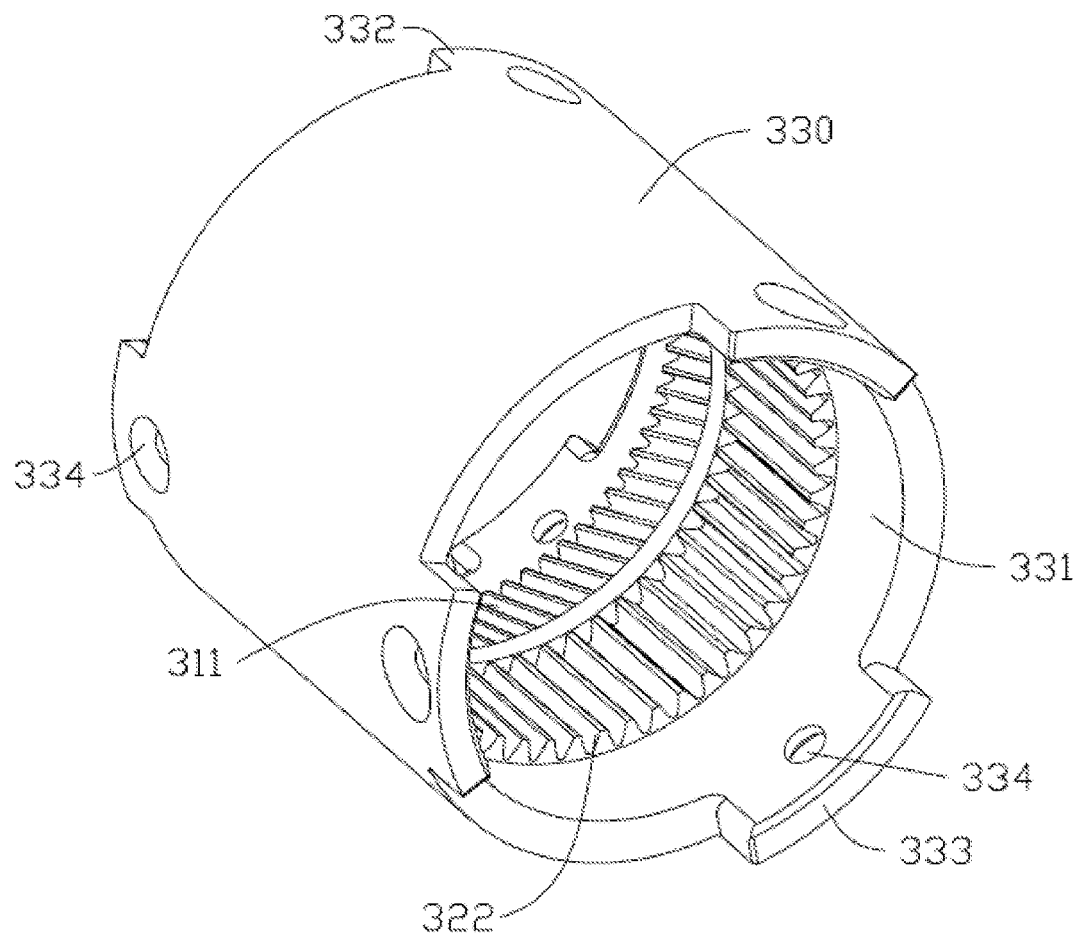
FIG. 7 is a perspective view of the internal ring gear shown in FIG. 5, viewed from another aspect.

Referring to FIG. 5 and FIG. 6, which are perspective views of an internal ring gear applied in the gearbox 30 viewed from two aspects, the internal ring gear 33 includes a housing 330, the first ring gear 311 and the second ring gear 322. The first ring gear 311 and the second ring gear 322 are formed at the inner surface of the internal ring gear 33. The housing 330 is composed of a single housing, that is, the housing 330 is not formed by assembling a plurality of housings. In the illustrated embodiment, the housing 330 is of a hollow cylindrical shape, and the first ring gear 311 and the second ring gear 322 are arranged in parallel at an inner surface 331 of the housing 330 along an axial direction of the housing 330. Preferably, an inner diameter of the first ring gear 311 is equal to an inner diameter of the second ring gear 322. In the embodiment, the first ring gear 311 is a helical ring gear with teeth disposed at an oblique angle with respect to the axial direction of the housing 330; and the second ring gear 322 is a spur ring gear with teeth disposed along the axial direction of the housing 330. In other embodiments, the first ring gear 311 is not limited to the helical ring gear, and the second ring gear 322 is not limited to the spur ring gear, as long as the first ring gear 311 and the second ring gear 322 can be arranged with their teeth disposed at different oblique angles. In other embodiments, a plurality of ring gears are disposed at the inner surface of the housing of the internal ring gear, with a certain angle defined between teeth of adjacent ring gears, and each ring gear corresponds to one planetary gear train. Preferably, the internal ring gear is integrally made from one or more of plastic, powder metal material and metal. That is, the housing 330 and the first ring gear 311 as well as the second ring gear 322 are integrally formed simultaneously, rather than being formed separately. Preferably, the internal ring gear may be formed through compressing and then sintering in a single mold cavity, such that the housing of the internal ring gear has no connection mark at a connecting area between the first ring gear 311 and the second ring gear 322, and an outer surface of the housing 330 has no connection mark at the connecting area between the first ring gear 311 and the second ring gear 322.

Preferably, the internal ring gear is made of powder metal material, and has a density less than 92% of its theoretical density, and a mass of 6.0 to 8.0 grams, and more preferably, 6.2 to 7.2 grams, per cubic millimeter.

Since it is difficult to implement mechanical processing to the internal ring gear with helical teeth, in this embodiment, the internal ring gear is manufactured through a powder metal method, which achieves lowed cost and improved manufacturability. In other embodiments, the internal ring gear may also be manufactured through injection molding.

Protrusions 332 and 333 are disposed at two ends of the housing 330 of the internal ring gear 33, and extend along the axial direction of the housing 330. The protrusions 332 and recesses 51 of the endcap 50 together define a protrusion-recess positioning structure to achieve rapid positioning between the internal ring gear and the motor 20. The protrusions 333 and recesses 41 of the mounting seat 40 together define a protrusion-recess positioning structure to achieve rapid positioning when the internal ring gear is mounted to the mounting seat 40. Mounting structures 334 are further disposed at the two ends of the internal ring gear. The internal ring gear is mounted to the motor 20 and the mounting seat 40 through the mounting structures 334, respectively. In this embodiment, the mounting structures 334 are mounting holes, and the internal ring gear is mounted to the endcap 50 of the motor 20 and the mounting seat 40 by screws extending through the mounting holes.

The second planet gears 323, the first rotary carrier 312 and the second rotary carrier 324 may also be made of powder metallurgy material. The first sun gear 310 may be made of metal. The second sun gear 321 and the first rotary carrier 312 may be integrally formed.

Figure 8:
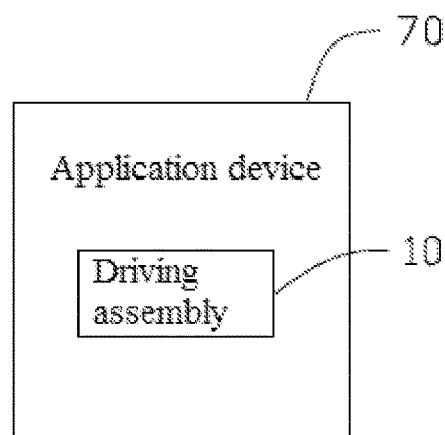
FIG. 8 is a block diagram of an application device employing the driving assembly of FIG. 1.

Referring to FIG. 8, an application device 70 is illustrated. The application device 70 includes the above driving assembly 10. The application device 70 may be a lawnmower, and the driving assembly 10 may be used to drive wheels of the lawnmower to move forward or backward. The application device 70 may also be a power lifting door for vehicle, and the driving assembly 10 may be used to open or close a door, such as a rear door.

Although the invention is described with reference to one or more embodiments, the above description of the embodiments is used only to enable people skilled in the art to practice or use the invention. It should be appreciated by those skilled in the art that various modifications are possible without departing from the spirit or scope of the present disclosure. The embodiments illustrated herein should not be interpreted as limits to the present disclosure, and the scope of the invention is to be determined by reference to the claims that follow.

The invention claimed is:

1. An internal ring gear comprising:
   a housing; and
   at least two internal ring gears integrally arranged at an inner surface of the housing, wherein the outer surface of the housing is smooth, and a diameter of the outer surface of the housing is consistent; the housing and the internal ring gears being a one piece monolithic integral unit made of powder metal material.

2. The internal ring gear of claim 1, comprising: a helical ring gear and a spur ring gear, the teeth of the helical ring gear are disposed at an oblique angle with respect to an axial direction of the housing, and the teeth of the spur ring gear are disposed along the axial direction of the housing.

3. The internal ring gear of claim 1, wherein the powder metal material has a density less than 92% of its theoretical density, and a mass of 6.0 to 8.0 grams per cubic millimeter.

4. A driving assembly comprising:
   a motor; and
   a gearbox comprising an internal ring gear, the internal ring gear comprising
      a housing; and
      at least two ring gears integrally arranged at an inner surface of the housing, wherein the outer surface of the housing is smooth, and a diameter of the outer surface of the housing is consistent; the housing and the internal ring gears being a one piece monolithic integral unit made of powder metal material.

5. The driving assembly of claim 4, wherein the internal ring gears comprises a helical ring gear and a spur ring gear, the teeth of the helical ring gear are disposed at an oblique angle with respect to an axial direction of the housing, and the teeth of the spur ring gear are disposed along the axial direction of the housing.

6. The driving assembly of claim 4, wherein the s powder metal material has a density less than 92% of its theoretical density, and a mass of 6.0 to 8.0 grams per cubic millimeter.

7. The driving assembly of claim 4, wherein mounting structures are provided at two end portions of the internal ring gear, the mounting structure at one of the two end portions is configured to mount the internal ring gear to the motor, and the mounting structure at the other of the two end portions is configured to mount the internal ring gear to a mounting seat of the driving assembly.

8. The driving assembly of claim 7, wherein the gearbox is directly fixed mounted to the mounting seat, and the mounting seat is connected with a load.

9. The driving assembly of claim 4, wherein positioning structures are provided at two end portions of the internal ring gear, the positioning structure at one of the two end portions is configured to position the internal ring gear relative to the motor, and the positioning structure at the other of the two end portions is configured to position the internal ring gear relative to the mounting seat.

10. The driving assembly of claim 5, wherein the gearbox comprises a first planetary gear train and a second planetary gear train, the first planetary gear train is a helical gear train including the helical ring gear, and the second planetary gear train is a spur gear train including the spur ring gear.

11. An application device comprising a driving assembly, the driving assembly comprising:
    a motor; and
    a gearbox comprising an internal ring gear, the internal ring gear comprising
       a housing;
       and at least two ring gears integrally arranged at an inner surface of the housing, wherein the outer surface of the housing is smooth, and a diameter of the outer surface of the housing is consistent; the housing and the internal ring gears being a one piece monolithic integral unit made of powder metal material.

12. The application device of claim 11, wherein the application device is a lawnmower or a power lifting door for vehicle.

13. The application device of claim 11, comprising: a helical ring gear and a spur ring gear, the teeth of the helical ring gear are disposed at an oblique angle with respect to an axial direction of the housing, and the teeth of the spur ring gear are disposed along the axial direction of the housing.

14. The application device of claim 11, wherein the powder metal material has a density less than 92% of its theoretical density, and a mass of 6.0 to 8.0 grams per cubic millimeter.

* * * * *